United States Patent
Gale et al.

(10) Patent No.: US 12,152,886 B2
(45) Date of Patent: Nov. 26, 2024

(54) TECHNIQUES FOR INDOOR WAYFINDING

(71) Applicant: Ally Financial Inc., Detroit, MI (US)

(72) Inventors: Dallas Gale, Phoenix, AZ (US);
Dzmitry Dubarau, Charlotte, NC (US);
Arvy Rajasekaran, Charlotte, NC (US); Jared Allmond, Detroit, MI (US); Harish Naik, Phoenix, AZ (US)

(73) Assignee: Ally Financial Inc., Detroit, MI (US)

(*) Notice: Subject to any disclaimer, the term of this patent is extended or adjusted under 35 U.S.C. 154(b) by 19 days.

(21) Appl. No.: 17/572,803

(22) Filed: Jan. 11, 2022

(65) Prior Publication Data
US 2023/0221122 A1 Jul. 13, 2023

(51) Int. Cl.
*G01C 21/20* (2006.01)
*G01C 21/00* (2006.01)

(52) U.S. Cl.
CPC ......... *G01C 21/206* (2013.01); *G01C 21/383* (2020.08)

(58) Field of Classification Search
None
See application file for complete search history.

(56) References Cited

U.S. PATENT DOCUMENTS

| | | | |
|---|---|---|---|
| 2009/0216438 A1* | 8/2009 | Shafer | G01C 21/206 701/414 |
| 2010/0299065 A1* | 11/2010 | Mays | G01C 21/206 707/E17.089 |
| 2011/0172906 A1* | 7/2011 | Das | G01C 21/206 701/533 |
| 2013/0321456 A1* | 12/2013 | Hultquist | G01C 21/3667 345/173 |
| 2014/0257687 A1* | 9/2014 | Chen | G06T 11/20 345/441 |
| 2017/0031925 A1* | 2/2017 | Mishra | G06F 16/444 |
| 2020/0082029 A1* | 3/2020 | Hartfiel | G06F 30/13 |

* cited by examiner

*Primary Examiner* — Rachid Bendidi
*Assistant Examiner* — Selena M Jin
(74) *Attorney, Agent, or Firm* — Holland & Hart LLP

(57) ABSTRACT

Methods, systems, and devices are described. Indoor wayfinding may be performed using a set of layers overlayed on a map, such as a site map of the surrounding environment of a building, using a combination of static and dynamic images. For example, a user device may transmit a request to a server for a route to a desired location of a floor of a building. In some cases, the server may, in response to the request, generate the route using a set of map layers that includes a static image of the site, a static image of a floor plan of the floor housing the location, a vector image of features such as rooms and offices of the floor that includes the desired location, and a vector image of a route from a starting location of the floor, such as an entrance or elevator, and the desired location.

25 Claims, 7 Drawing Sheets

TECHNIQUES FOR INDOOR WAYFINDING

FIELD OF TECHNOLOGY

The present disclosure relates generally to generating maps and routes, and more specifically to techniques for indoor wayfinding.

BACKGROUND

Companies and organizations may provide maps and route information of sites and facilities, such as office buildings, to visitors and/or employees to aid in finding desired locations (e.g., offices, suites, conference rooms). In some examples, the maps and route information may be provided in the form of electronic images. For instance, a user in an office building may be provided with respective routes to locations via an electronic device (e.g., using an application displaying a map on a mobile device, a smartphone, a tablet, a wearable device, or the like). In some cases, a route between a starting location and an ending location may be overlayed on publicly-available maps using shared resources from a map service. Such techniques, however, may not provide enough detail for a user to navigate to some locations and/or points of interest within the building (e.g., specific objects or locations on a floor plan). More specifically, the use of public maps when generating route information may prohibit a user from zooming in close enough to identify, and navigate to, specific features within a building. In other examples, rendering maps having relatively increased detail for display to a user may be computationally complex.

SUMMARY

The described techniques relate to improved methods, systems, devices, and apparatuses that support techniques for indoor wayfinding. Generally, the described techniques provide for methods and techniques to generate a route between locations in a building or site using one or more map layers. The map layers may include static and dynamic images, such as a site layer that includes a static image corresponding to a site map of the building, a floor plan layer that includes to a static image corresponding to a floor of the building, a features layer that includes a dynamic image corresponding to features of the floor (e.g., rooms, offices, lobbies, etc.), and a route layer that includes a dynamic image corresponding to intersections and a route between a starting location and a destination on the floor of the building.

A method is described. The method may include transmitting, to a server, a representational state transfer call requesting route data and feature data for generating a route between a first location and a second location different from the first location. The method may include receiving a messages including the route data and the feature data from the server in response to the representational state transfer call, the feature data being associated with the first location and the second location, and the route data being associated with the route. The method may include generating a map including a plurality of layers based on the feature data and the route data, the plurality of layers including a first layer including a raster image of a site, a second layer including a raster image of a floor plan corresponding to the site, a third layer including a vector image of a plurality of features corresponding to the floor plan, and a fourth layer including a vector image of the route between the first location and the second location. The method may include displaying the map including the plurality of layers.

An apparatus is described. The apparatus may include a processor, memory coupled with the processor, and instructions stored in the memory. The instructions may be executable by the processor to cause the apparatus to transmit, to a server, a representational state transfer call requesting route data and feature data for generating a route between a first location and a second location different from the first location, receive a messages comprising the route data and the feature data from the server in response to the representational state transfer call, the feature data being associated with the first location and the second location, and the route data being associated with the route, generate a map comprising a plurality of layers based at least in part on the feature data and the route data, the plurality of layers including a first layer comprising a raster image of a site, a second layer comprising a raster image of a floor plan corresponding to the site, a third layer comprising a vector image of a plurality of features corresponding to the floor plan, and a fourth layer comprising a vector image of the route between the first location and the second location, and display the map comprising the plurality of layers.

Another apparatus is described. The apparatus may include means for transmitting, to a server, a representational state transfer call requesting route data and feature data for generating a route between a first location and a second location different from the first location, means for receiving a messages comprising the route data and the feature data from the server in response to the representational state transfer call, the feature data being associated with the first location and the second location, and the route data being associated with the route, means for generating a map comprising a plurality of layers based at least in part on the feature data and the route data, the plurality of layers including a first layer comprising a raster image of a site, a second layer comprising a raster image of a floor plan corresponding to the site, a third layer comprising a vector image of a plurality of features corresponding to the floor plan, and a fourth layer comprising a vector image of the route between the first location and the second location, and means for displaying the map comprising the plurality of layers.

A non-transitory computer readable medium storing code is described. The code may include instructions which, when executed by a processor, may: transmit, to a server, a representational state transfer call requesting route data and feature data for generating a route between a first location and a second location different from the first location; receive a messages including the route data and the feature data from the server in response to the representational state transfer call, the feature data being associated with the first location and the second location, and the route data being associated with the route; generate a map including a plurality of layers based on the feature data and the route data, the plurality of layers including a first layer including a raster image of a site, a second layer including a raster image of a floor plan corresponding to the site, a third layer including a vector image of a plurality of features corresponding to the floor plan, and a fourth layer including a vector image of the route between the first location and the second location; and display the map including the plurality of layers.

In some examples of the method, apparatuses, and non-transitory computer-readable medium described herein, generating the map may include operations, features, means, or instructions for setting the raster image of the site as the first layer based at least in part on the first location and the second location being at the site and setting the raster image of the floor plan as the second layer based at least in part on a floor at the site including the first location and the second location.

In some examples of the method, apparatuses, and non-transitory computer-readable medium described herein, the feature data comprises respective information for each feature of the plurality of features including first information for the first location and second information for the second location.

In some examples of the method, apparatuses, and non-transitory computer-readable medium described herein, the first information comprises an identifier associated with the first location, a floor associated with the first location, an intersection associated with the first location, a type of the first location, an indicator of a remaining portion of a route to the first location, alternative route information for the first location, or any combination thereof and the second information comprises an identifier associated with the second location, a floor associated with the second location, an intersection associated with the second location, a type of the second location, an indicator of a remaining portion of a route to the second location, alternative route information for the second location, or any combination thereof.

In some examples of the method, apparatuses, and non-transitory computer-readable medium described herein, the respective information for each feature of the plurality of features may be converted into map coordinates relative to an origin and the route may be generated for the fourth layer based at least in part on the map coordinates.

In some examples of the method, apparatuses, and non-transitory computer-readable medium described herein, each feature of the plurality of features may be represented as an object that corresponds to a room, an office, a workstation, a desk, a space, an elevator, or any combination thereof.

In some examples of the method, apparatuses, and non-transitory computer-readable medium described herein, the route data comprises one or more intersection objects associated with the route between the first location and the second location, each intersection object comprising a name, a floor identifier, a parent intersection identifier, or any combination thereof.

In some examples of the method, apparatuses, and non-transitory computer-readable medium described herein, one or more intersection objects may be converted into respective map coordinates relative to an origin and the route may be generated for the fourth layer based at least in part on the respective map coordinates.

In some examples of the method, apparatuses, and non-transitory computer-readable medium described herein, the floor plan may be from a set of two or more floor plans corresponding to the site, each floor plan of the set of two or more floor plans associated with a respective floor of the site.

In some examples of the method, apparatuses, and non-transitory computer-readable medium described herein, the raster image of the floor plan may have fixed dimensions.

In some examples of the method, apparatuses, and non-transitory computer-readable medium described herein, the raster image of the site may have fixed dimensions.

In some examples of the method, apparatuses, and non-transitory computer-readable medium described herein, the route data and the feature data may be formatted in accordance with a geographic JavaScript object notation.

DETAILED DESCRIPTION

Figure 1:
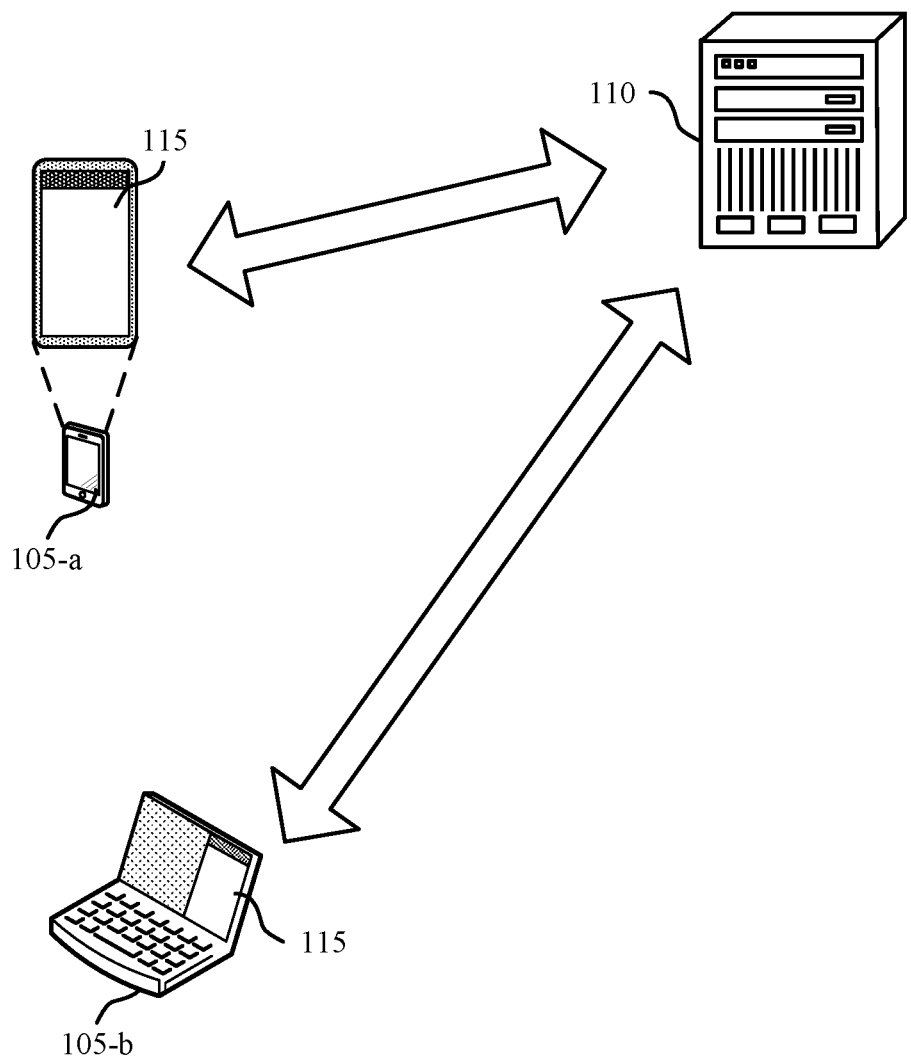
FIG. 1 illustrates an example of a system that supports techniques for indoor wayfinding in accordance with examples as disclosed herein.

Wayfinding systems may be used to orient a user in a physical space and navigate to a target destination. For example, the user request a map from a server that includes a route between a staring location and the target destination. In some wayfinding systems, such as outdoor wayfinding systems, private routes may be overlayed on public maps. For example, a route between locations in a city may be overlayed on a publicly available road map of the city. Accordingly, a user may follow the defined routes to their chosen destination using publicly shared resources from a map service. In some cases, the routes generated by the map service may be private to the user and overlayed on the public map data. Alternatively, in indoor wayfinding systems, a user may request directions to a specific location, such as a room or office on a floor of a building. To generate a route to the desired location, a floor plan of the floor of the building may be converted to a vector image and overlayed on a publicly available map, such as a site map of the area surrounding the building. In some cases, the location for a feature of the map (e.g., the location of desired room) may be described using a geo coordinate system of the site map. For example, the location of the feature may be described using a set of coordinates that describe the latitude and longitude of the location. However, such a system may use specialized applications and software to draw the features of the floor plans, which may be overly complex or resource expensive, or both. Additionally, such a system may use publicly available maps, which may compromise security or privacy of the user.

As described herein, indoor wayfinding may be performed using a set of layers overlayed on a map, such as a site map of the surrounding environment of a building, using a combination of static and dynamic images, such as raster images and vector images. For example, a user device may transmit a request to a server for a route to a desired location of a floor of a building. In some cases, the server may, in response to the request, generate the route using a set of map layers that includes a static image of the site map (e.g., the nearby environment of the building), a static image of a floor plan of the floor housing the location, a vector image of features such as rooms and offices of the floor that includes the desired location, and a vector image of a route from a starting location of the floor, such as an entrance or elevator, and the desired location. In some cases, the described indoor wayfinding system may not include a vector image of the floor plan, which may simplify operations and algorithms used to perform the wayfinding (e.g., by omitting steps related to generated a vector image for the floor plan). Additionally, the described wayfinding system may not use publicly available maps or map services. Accordingly, user security and privacy may be improved, for example by allowing aspects of the described wayfinding system to remain private or under control of an owning entity.

Aspects of the disclosure are initially described in the context of a set of map layers. Aspects of the disclosure are further illustrated by and described with reference to apparatus diagrams, system diagrams, and flowcharts that relate to techniques for indoor wayfinding.

This description provides examples, and is not intended to limit the scope, applicability or configuration of the principles described herein. Rather, the ensuing description will provide those skilled in the art with an enabling description for implementing various aspects of the principles described herein. As can be understood by one skilled in the art, various changes may be made in the function and arrangement of elements without departing from the application.

FIG. 1 illustrates an example of a system 100 that supports techniques for indoor wayfinding in accordance with examples as disclosed herein. The system 100 may include one or more user devices 105 (e.g., including user device 105-a and user device 105-b). Each user device 105 may be an example of a laptop, a desktop computer, a mobile device, a smart device, or the like. The system 100 may also include a server 110 (e.g., a database server, an application server, a web server, a cloud server, a server cluster, a virtual machine, a physical server, a machine learning server, etc.) and/or other devices. These devices may interact within the system 100, and may implement a process (e.g., a function, algorithm, model, etc.) for one or more applications 115 (e.g., web-based applications, mobile applications, etc.) at the user device 105.

The system 100 may be an example of a database system or a cloud-based system supporting techniques for indoor wayfinding and may support a number of applications, pages, or both for displaying components. These components may display information, perform defined actions, provide links to other applications (e.g., third-party applications outside of the system), or provide any number of other features as indicated in the component definitions. The applications, pages, and components may be configurable by a user (e.g., an administrative user of an organization, a developer writing code to support backend or frontend processes, etc.). For example, the application 115 may enable the system 100 to generate a site maps using one or more layers of images via the application 115. In some case, each image of a layer may be a static image or a dynamic image (e.g., each image may be a static raster image or a dynamic vector image).

The server 110 may include a framework in which to run the one or more applications 115 at the user devices 105. As an example, the server 110 may be an example of an application server and may implement system software on which the applications may run. More generally, the server 110 may provide a software framework for creating and running applications 115. As such, the server 110 may support administrative functions for creating, modifying, or otherwise managing various applications 115. For example, an administrative user or software developer may create and customize an application 115 using various software or components of the server 110 (e.g., an application builder, an application programming interface (API), or other application tools). The server 110 may support building applications or pages that can be rendered on a number of different user interface types at the user devices 105 (e.g., including different types and versions of user devices 105). In some cases, the server 110 may perform data processing, and the server 110 may be an example of a cloud device or may be located at data center. The server 110 may support serving dynamic content and transferring applications or application data from one user device 105 to another. In some cases, the server 110 may further provide for hosting business logic applications and processes using various protocols.

In some cases, the server 110 may be part of a client-server system, a mobile device system, an electronic banking system, a mobile network system, or the like. In some cases, the server 110 may support account management solutions. This may include support for wayfinding applications (e.g., application 115) that provide a user with access to one or more routes between features of a generated site map. Server 110 may receive data associated with an application 115 over a network connection, and may store and analyze the data. In some cases, server 110 may receive data directly from an interaction between a user device and the server 110. In some examples, server 110 may be implemented using one or more remote servers. In some cases, the remote servers may be located at one or more data centers.

In some examples, the server 110 may be an example of a database server, which may comprise a database application using a particular architecture (e.g., a client/server architecture). The server 110 may include hardware or software components supporting data processing for the system 100. The server 110 may accordingly include a processing component and a local data storage component, where the local data storage component supports the memory resources of the server 110, and may be an example of a magnetic tape, magnetic disk, optical disc, flash memory, main memory (e.g., random-access memory (RAM)), memory cache, cloud storage system, or a combination thereof. The server 110 may perform various functions on data sets, which may include retrieving maps of locations of buildings, floor plans of buildings, generating feature maps of floor plan s, configuring routes using the features, or any combination thereof. The functions performed by the system 100 may be based on a user input command (e.g., via the application 115) or may be automatic based on a configuration of the system 100.

The user devices 105, the server 110, or both may generate a route between locations on a floor of a building using one or more map layers. Each layer of the one or more layers may include static and/or dynamic images or image files, such as a static raster image or a dynamic vector image, or a combination thereof.

A raster image may be an example of a static image or image file made up of a set of pixels, such as a bitmap image. For example, the raster image may include a rectangular grid of pixels of various colors. The colors of the each pixel of the raster image may be specified in the image file of the raster image. In some cases, a raster image may have a resolution which corresponds to a quantity of pixels in a unit of area of the raster image. For example, the resolution of an image may be expressed in pixels per inch (PPI). In some cases, a raster image with a relatively larger resolution (e.g., a large PPI) may be of higher quality (e.g., lines and other features of the image may be sharper or clearer) than a raster image with a relatively smaller resolution. A raster image may be implemented using a variety of image file types or formats, such as JPEG files, portable networks graphics (PNG) files, or tag image file format (TIFF) files, among other examples.

In some examples, a raster image may be resized or rescaled. For example, a raster image may be enlarged or shrunken, either uniformly (e.g., the aspect ratio of the raster image may be held constant) or in a particular direction. However, resizing the raster image may modify the resolution, and therefore the quality, of the raster image, because the total quantity of pixels included in the raster image may remain constant. For example, if the raster image is enlarged, the resolution of the raster image may decrease. That is, the pixels of the raster image may be spread over a larger area to accommodate for the enlargement. Accordingly, the resolution (e.g., the PPI) may decrease and the quality of the raster image may decrease in kind.

Alternatively, a vector image may be resized or rescaled without an associated change in image resolution or image quality. In some examples, a vector image may include a file defining features of the vector image (e.g., shapes or objects of the vector image, regions of colors, colors of shapes, size of shapes, orientation of shapes, points, curves, lines, etc.) mathematically. Accordingly, a vector image may be resized or rescaled without an associated change in resolution or image quality. A vector image may be implemented using a variety of image file types or formats, such as a JavaScript Object Notation (JSON) file, a geometric JSON (geoJSON) file, adobe illustrator (AI) file, an encapsulated postscript (EPS) file, or a scalable vector graphics (SGV) file, among other examples.

The system 100 may support techniques to generate a route between locations in a building or site using one or more map layers. The map layers may include static and dynamic images, such as a site layer that includes a static image corresponding to a site map of the building, a floor plan layer that includes to a static image corresponding to a floor of the building, a features layer that includes a dynamic image corresponding to features of the floor (e.g., rooms, offices, lobbies, etc.), and a route layer that includes a dynamic image corresponding to intersections and a route between a starting location and a destination on the floor of the building. Such techniques supported by the system 100 may provide for enhanced map generation and display by avoiding rendering multiple (e.g., more than two) layers of dynamic images, which may be computationally complex. Moreover, the use of static images of floor plans and site maps may enable floor plans and related information to remain secured within the system 100 and avoid the use of public information for generating routes and maps.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
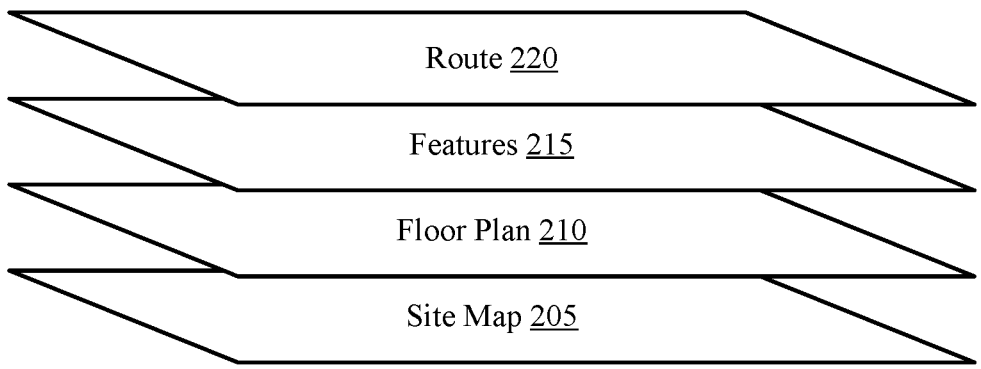
FIG. 2 illustrates an example of a set of map layers that supports techniques for indoor wayfinding in accordance with examples as disclosed herein.

FIG. 2 illustrates an example of a set of map layers 200 that supports techniques for indoor wayfinding in accordance with examples as disclosed herein. The set of map layers 200 may be included in a map of a location, such as a floor of a building (e.g., an office building or other workspace). The map may include a route between various features or locations of the map, such as a route between an elevator on a floor of a building and a desired room, such as an office, a conference or meeting room, a set of cubicles, or other locations on the floor of the building.

In some cases, a user device, such as the user device 105 as described with reference to FIG. 1, may send a message requesting a map from a server, such as the server 110 as described with reference to FIG. 1, that includes a route between a starting location, such as a bank of elevators, a stairwell, or an entrance to the building, and a destination, such as an office, a conference or meeting room, a set of cubicles, or other locations on a floor of the building. To facilitate the request, the server may generate the map, including the set of map layers 200, and transmit the map to the user device for display to the user. Alternatively, the user device may generate the map independently.

The set of map layers 200 may include a site map 205. In some cases, the site map 205 may include a map or image of the outer environment of a building. For example, the site map may include a raster image (e.g., a static PNG image) of nearby streets or roads, a parking area of the building, surrounding landscape, or a combination thereof. The site map 205 may be common to all floors of a building. For example, if a first user requests a first route between locations on a first floor of a building and a second user requests a second route between locations on a second, different floor of the same building, the site map 205 for the first route and the second route may be the same (e.g., may depict the same building and surroundings). In some cases, the raster image of the site map may have fixed dimensions (e.g., 2241 pixels by 1162 pixels). In some cases, the site map 205 of the building may be stored by the user device 105, the server 110, or both. Alternatively, the site map 205 may be retrieved from an outside source (e.g., an outside website or database) in response to the request for the route from the user device 105 or the server 110.

The set of map layers 200 may also include a floor plan 210. The floor plan 210 may depict a floor of the building (e.g., the building depicted in the site map 205) in which the requested destination resides. For example, if the user device 105 requested a route to a location on a first floor of a building, the floor plan 210 may depict the first floor of the building. In some cases, the floor plan 210 may depict rooms (e.g., conference rooms, offices, meeting rooms, etc.), open areas (e.g., lobbies, common areas, lounges, groups of cubicles, etc.), stairs or stair wells leading to other floors or locations of the building, elevators between floors of the building, entrances or exits of the building (e.g., front doors, emergency exits, etc.), or desks, among other examples. In some cases, the floor plan 210 of a floor may be stored by the user device 105, the server 110, or both. Alternatively, the floor plan 210 may be retrieved from an outside source (e.g., an outside website or database) in response to the request for the route from the user device 105 or the server 110. In some examples, a single site layer may correspond to multiple possible floor plans. For example, a building located on the site depicted in the site plan may include multiple floors and associated floor plans. In some cases, the floor plan 210 may be an example of a raster image (e.g., a static PNG) image. Accordingly, adjusting the size of aspect ratio of the floor plan 210 (e.g., enlarging the floor plan 210) may change the resolution or image quality (or both) of the floor plan 210.

The set of map layers 200 may include a features layer 215. The features layer 215 may be an example of a vector image which defines various features of the floor plan 210. In some cases, the features layer 215 may include an indication of the location, size shape, or any combination thereof, of points of interest (e.g., features) of the floor plan 210. For example, the features layer 215 may include an indication of the location (relative to an origin of the floor plan 210) of rooms (e.g., conference rooms, offices, meeting rooms, etc.), open areas (e.g., lobbies, common areas, lounges, groups of cubicles, etc.), stairs or stair wells leading to other floors or locations of the building, elevators between floors of the building, entrances or exits of the building (e.g., front doors, emergency exits, etc.), among other examples.

In some cases, the features of the features layer 215 may be defined in a feature file, such as a geoJSON file. For example, the feature file may include a list of the location relative to an origin of the floor plan 210 of features, as well as the size, dimension, shape, type of feature, identifier for the feature, or any combination thereof. By way of example, an entry for a feature corresponding to an elevator in the feature file may be depicted according to the following:

```
{
  "type": "Feature",
  "properties": {
    "featureId": "2620",
    "featureType": "elevator"
  },
  "geometry": {
    "type": "Polygon",
    "coordinates":
      [[[1268.2, 701.6],
      [1511.4, 701.6],
      [1511.4, 463.4],
      [1268.2, 463.4], [1268.2, 701.6]]]
  }
}
```

In this example, the shape and position of an elevator may be defined. For example, the location of corners defining the shape of the elevator feature may be indicated by the coordinates. In some examples, the numerical values of the coordinates may correspond to a horizontal and vertical distance from an origin of the floor plan 210. In some examples, the origin of the floor plan 210 may correspond to a bottom left corner of the floor plan, but those skilled in the art may recognize that the teachings described herein may be applied to any choice of origin.

The feature file may be retrieved from the server 110 in response to the request from the user device 105 using a command such as a representational state transfer (REST) call. In some cases, a REST call may include a command or operation to perform (e.g., a command to retrieve a resource, such as the feature list or features layer 215), a header, which may include information associated with the user device 105, a path, such as address, location or other identifying information, associated with the resource, or a combination thereof. REST may refer to a software architectural style that may provide standards between computer systems. In some examples, systems supporting REST architectures, such as the system 100, may be stateless systems such that the server 110 may not need to be aware of a state of the user device 105, and vice versa. In accordance with the REST architecture, the user device 105 may send requests to retrieve and/or modify resources, and the server 110 may provide responses to the requests from the user device 105. In some examples, a REST call may use or implements aspects of the Hypertext Transfer Protocol (HTTP) for transferring information over a network (e.g., for communications between an application and a server).

In some examples, the features layer 215 corresponding to a floor plan 210 may be generated using a vector image editing software or other operation to generate the feature file. For example, the feature file may be generated by a user or administrator using some software, which may allow an operator to define one or more features, including feature objects such as a name, a floor, an intersection, a feature type, or any combination thereof. In some cases, the software may output a feature file which may be adjusted or modified (e.g., using a script) to be a vector image file, such as a geoJSON file, as described in greater detail with reference to FIG. 4. Alternatively, the features layer 215 may be generated automatically, for example using an algorithm to determine features of a floor plan 210. In some cases, feature files corresponding to a features layer 215 may be generated and stored in a database, such as a feature database of the server 110, prior to the request from the user device 105. Such an approach may improve operations using the set of map layers 200, for example by reducing the amount of time and system resources used to fulfill the request from the user device 105.

The set of map layers 200 may include a route layer 220. The route layer 220 may be an example of a vector image which defines a route between features of the features layer 215. In some cases, the route layer 220 may include an indication of a set of direction or a path for a user to follow to get from a starting location to a requested destination. By way of example, the route layer 220 may depict a path leading from a first feature of the features layer 215, such as an elevator, a stairwell, or an entrance, to a second feature of the features layer 215, such as an office, a conference room, or a lobby, among other examples.

In some examples, the server 110 or the user device 105 (or both) may generate the route layer 220 using the features defined in the features layer 215 and one or more additional objects for routing around the floor corresponding to the floor plan 210, such as intersections. In some cases, the intersections may be examples of objects, such as geoJSON objects, having a position on the floor plan 210 (e.g., relative to the origin of the floor plan 210). For example, an intersection may correspond to an intersection of hallways or other pathways of the floor plan 210, as described in greater detail with reference to FIG. 5.

In some cases, the route layer 220 may be retrieved from the server 110 in response to the request from the user device 105 using a command such as a REST call. The REST call for the route layer 220 may return a vector image file, such as a geoJSON file, containing the route layer 220 or other intersection data. In some cases, aspects of the route layer 220, such as intersection location and hierarchy, may be generated using a vector image editing software or other operation to generate the feature file. For example, the intersection data may be generated by a user or administrator using some software.

In some cases, the software may output a feature file which may be adjusted or modified (e.g., using a script) to be a vector image file, such as a geoJSON file, as described in greater detail with reference to FIG. 5. Alternatively, the intersection data may be generated automatically. The route between features of the route layer 220 may be generated or determined using a wayfinder algorithm or other approach to determine a path between features using the intersection data. In some cases, intersection data may be generated and stored in a database, such as a feature database of the server 110, prior to the request from the user device 105. Such an approach may improve operations using the set of map layers 200, for example by reducing the amount of time and system resources used to fulfill the request from the user device 105.

Figure 3:
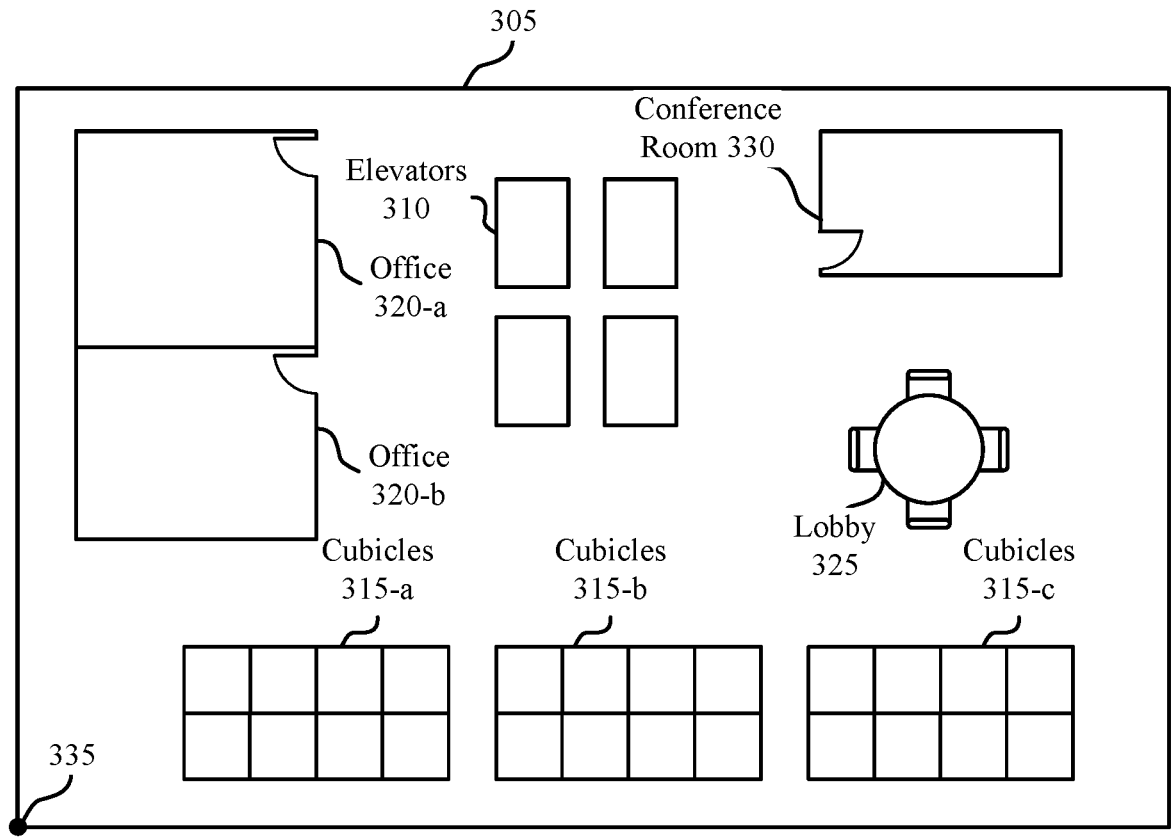
FIG. 3 illustrates an example of a map layer that supports techniques for indoor wayfinding in accordance with examples as disclosed herein.

FIG. 3 illustrates an example of a map layer 300 that supports techniques for indoor wayfinding in accordance with examples as disclosed herein. The map layer 300 may be an example of a floor plan 305. By way of example, the floor plan 305 may include one or more objects or locations of an office or other environment, such as a bank of elevators 310, one or more sets of cubicles 315 or work stations, such as the set of cubicles 315-a, the set of cubicles 315-b, and the set of cubicles 315-c, one or more offices 320, such as the office 320-a and the office 320-b, a common area or lobby 325, and a conference room 330.

In some examples, the floor plan 305 may be a raster image, such as a static PNG image. For example, the floor plan 305 may include a visual depiction of the elements of the floor (e.g., the bank of elevators 310, the set of cubicles 315 or work stations, the offices 320, a common area or lobby 325, and the conference room 330, along with other features such as hallways, exits or entrances, stairwells, restrooms, etc.). Accordingly, the resolution or image quality (or both) of the floor plan 305 may change if the floor plan 305 is resized. For example, the floor plan 305 may become blurry or unfocused if the floor plan 305 is enlarged. Accordingly, the dimensions of the raster image depicting the floor plan 305 may be substantially fixed or predetermined (e.g., 2241 pixels by 1162 pixels), so that the image quality of the raster image depicting the floor plan 305 may remain substantially constant.

In some cases, a respective floor plan 305 for each floor of one or more buildings may be stored in the server 110 and may be retrieved to generate the set of map layers 200 in response to a request for a route from a user device 105. For example, if the user device 105 requests a route to a location depicted in a floor plan 305, the server may retrieve the floor plan 305 to be used in generating the route. Additionally or alternatively, the floor plan 305 for each floor of the one or more buildings may be stored in locations other than a database of the server 110, for example an outside database accessible via a website or other method. In such cases, the server 110 or user device 105 (or both) may retrieve the floor plan 305 in response to the user request.

The floor plan 305 may include an origin 335 to measure the location of objects of the floor plan 305. For example, the location of objects of the floor plan 305 may be represented by coordinates using the origin 335, such as rectangular coordinates indicating the vertical and horizontal distance from the origin 335 to the object. In some examples, the origin 335 may be located in the bottom left corner of the floor plan 305. However, one skilled in the art may appreciate that the location of objects may be specified using any choice of origin.

Figure 4:
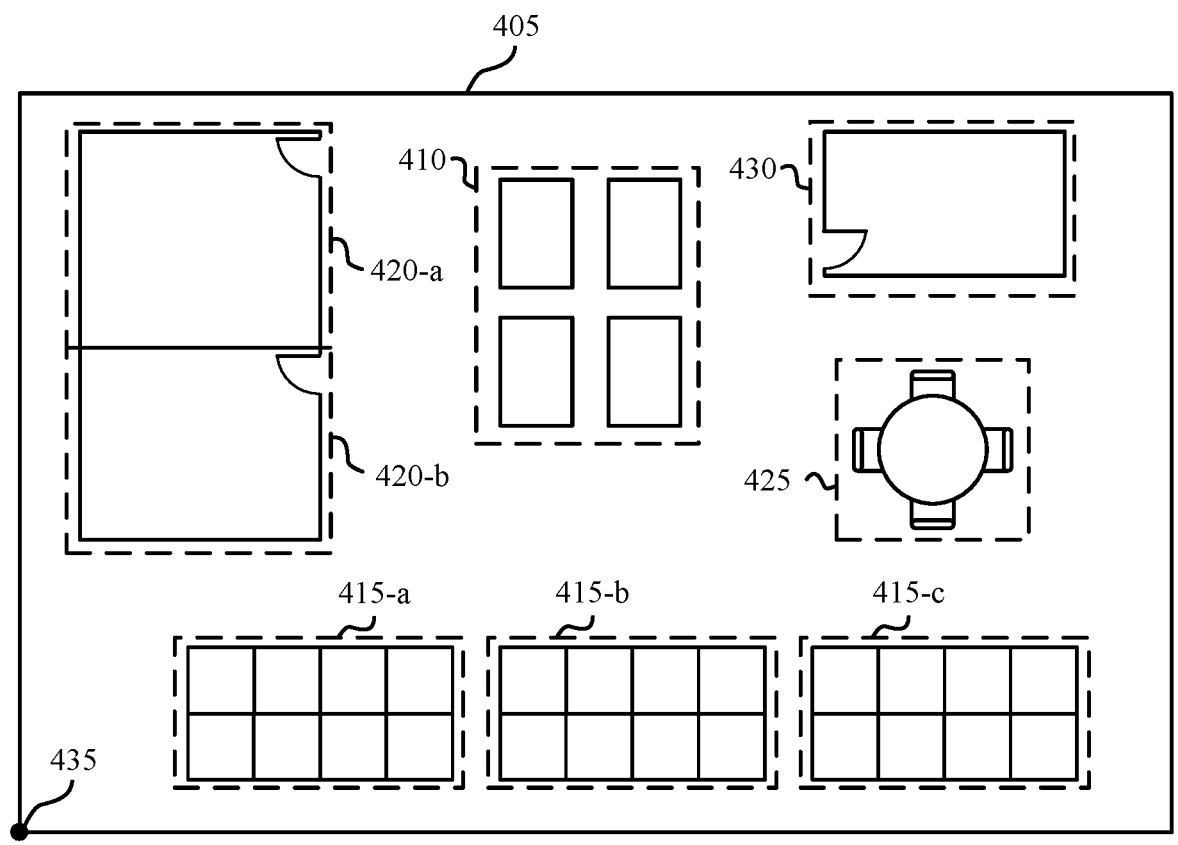
FIG. 4 illustrates an example of a map layer that supports techniques for indoor wayfinding in accordance with examples as disclosed herein.

FIG. 4 illustrates an example of a map layer 400 that supports techniques for indoor wayfinding in accordance with examples as disclosed herein. The map layer 400 depict a set of features superimposed over a base image 405. The base image 405 may be an example of the floor plan 305 as described with reference to FIG. 3. In some examples, an operator or administrator (e.g., an operator or administrator of the server 110) may generate the set of features of the map layer 400 and store the set of features in a database (e.g., a feature database of the server 110). The user device 105 or the server 110 (or both) may retrieve the set of features of the map layer 400 in response to a request from the user device 105 for a route between a starting location and a destination and as part of generating a set of map layers (e.g., the set of map layers 200 described with reference to FIG. 2).

In some cases, a vector image editing software may be used to generate the set of features of the map layer 400. For example, the software (or a user of the software) may generate features corresponding to the base image 405 (e.g., a raster image, such as the floor plan 305) having a fixed dimension. The features may correspond to objects, locations, or rooms depicted in the base image 405. In some aspects, the features may be represented as geometric shapes or objects that correspond to a particular point of interest, space, or location. For example, the software may generate a feature 410, which may correspond to elevators (e.g., the elevators 310 depicted in the floor plan 305 described with reference to FIG. 3). In addition, the software may generate features 415-a, 415-b, and 415-c, which may correspond to a set of one or more cubicles (e.g., the sets of cubicles 315 depicted in the floor plan 305 described with reference to FIG. 3); features 420-a and 420-b, which may correspond to one or more offices (e.g., the offices 320 depicted in the floor plan 305 described with reference to FIG. 3); a feature 425, which may correspond to a lobby or other are on the floor (e.g., the lobby 325 depicted in the floor plan 305 described with reference to FIG. 3); and a feature 430, which may correspond to a conference room (e.g., the conference room 330 depicted in the floor plan 305 described with reference to FIG. 3).

In some examples, as part of generating the set of features of the map layer 400, the software may add data to the features describing attributes of the features. The data may include a name of the feature, and identifier (e.g., an identification number) of the feature, a type of the feature (e.g., whether the feature corresponds to an office, a conference room, an elevator, a lobby, a supply room, a server room, etc.), a floor number of the feature (e.g., which floor of the site or building the object corresponding to the feature is on), an intersection for the feature, an indication of the direction of a final leg or "last mile" to arrive at the feature (e.g., a final portion of a route before the feature is reached), or any combination thereof. An intersection of a feature may correspond to a nearby location on a route of the base image 405, such as a location of a hallway or other walkway. In some cases, the intersection may include or be associated with a parent intersection, as described in greater detail with reference to FIG. 5. The direction of the final leg of a feature may be an indication of the direction a user may move to reach the destination (e.g., a target features, such as the feature 420-a corresponding to the office 320-a). For example, the direction of the final leg may be horizontal or vertical.

After the software (or software user) has defined the set of features of the map layer 400, the software may export the set of features of the map layer 400 and the associated data. For example, the software may generate one or more files which include the features and associated data and store the one or more files in an electronic storage, such as a database of the server 110. Because the format of the one or more files may be specific to the software, the one or more files may not initially be compatible with other programs. Accordingly, the one or more files may be converted to a vector image file format, such as a geoJSON file format. In some examples, converting the one or more files to the vector image file format may include determining and storing a location for each feature of the set of features. The location may be relative to an origin 435 of the base image 405, and may be an example of a set of rectangular coordinates. Additionally, route information (e.g., a route between a starting location indicated in the user request and the destination indicated in the user request) may be included in the converted one or more files.

Figure 5:
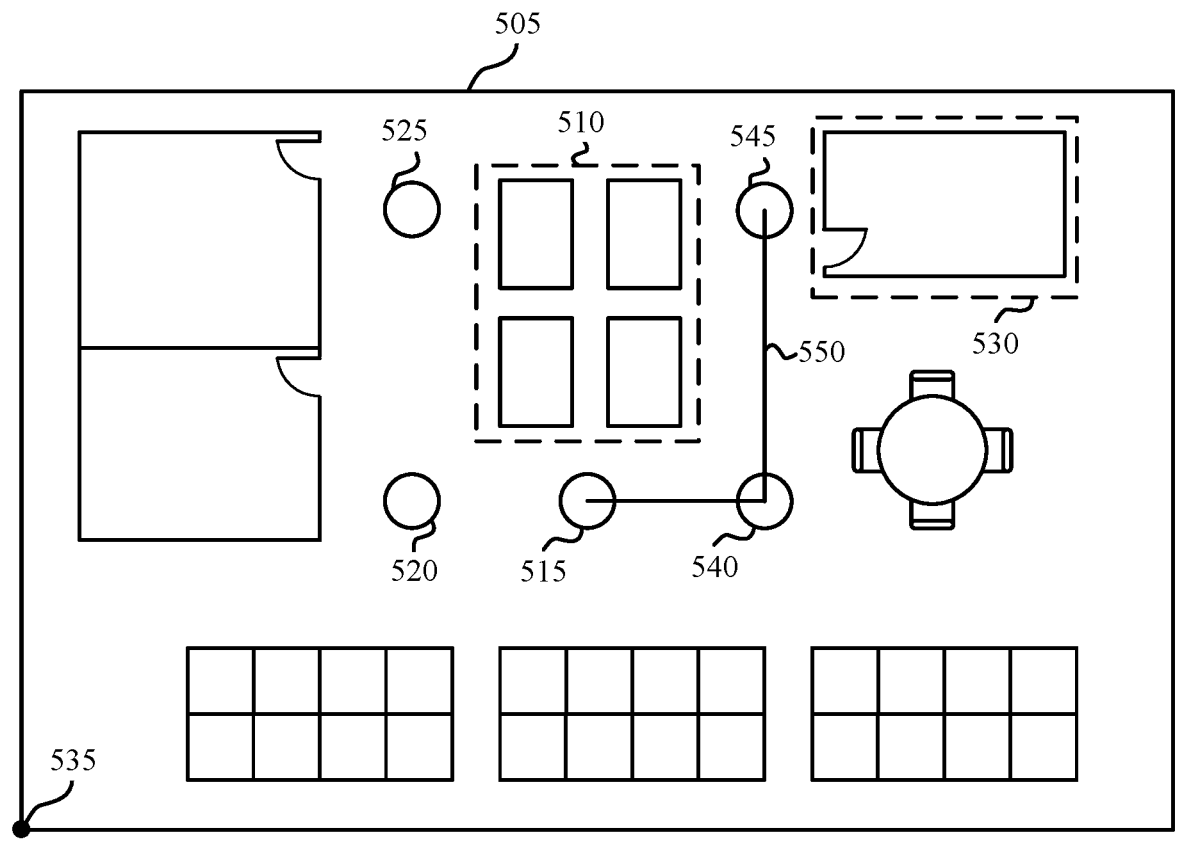
FIG. 5 illustrates an example of a map layer that supports techniques for indoor wayfinding in accordance with examples as disclosed herein.

FIG. 5 illustrates an example of a map layer 500 that supports techniques for indoor wayfinding in accordance with examples as disclosed herein. The map layer 500 depict a set of intersections superimposed over a base image 505. The base image 505 may be an example of the floor plan 305 as described with reference to FIG. 3. In some cases, the base image 505 may additionally include one or more features from the set of features of the map layer 400 described with reference to FIG. 4. For example, the base image 505 may include a feature 510 corresponding to an elevator (e.g., the elevator 310 described with reference to FIG. 3) and corresponding to the feature 410 described with reference to FIG. 4. In addition, the base image 505 may include a feature 530 corresponding to a conference room (e.g., the conference room 330 described with reference to FIG. 3) and corresponding to the feature 430 described with reference to FIG. 4.

In some examples, an operator or administrator (e.g., an operator or administrator of the server 110) may generate the set of intersections of the map layer 500 and store the set of intersections in a database (e.g., an intersections database of the server 110). The user device 105 or the server 110 (or both) may retrieve the set of features of the map layer 500 in response to a request from the user device 105 for a route between a starting location and a destination and as part of generating a set of map layers (e.g., the set of map layers 200 described with reference to FIG. 2). In an illustrative example, the starting location may be the feature 510 and the destination may be the feature 530 (e.g., the user may have requested a route from the elevator to the conference room).

In some cases, a vector image editing software may be used to generate the set of intersections of the map layer 500. For example, the software (or a user of the software) may generate one or more intersections corresponding to the base image 505 (e.g., a raster image, such as the floor plan 305) having a fixed dimension. The intersections may correspond to locations in hallways or walkways from which the user may access rooms or other features depicted in the base image 505. For example, the software may generate: an intersection 515, which may correspond to an area near the elevators depicted in the floor plan (e.g., the elevators 310 of the floor plan 305 described with reference to FIG. 3); an intersection 520, which may correspond to an area near one or more offices (e.g., the offices 320 described with reference to FIG. 3) and a horizontal distance away from the intersection 515; an intersection 525, which may correspond to an area near the offices and a vertical distance away from the intersection 520; an intersection 540, which may correspond to an area near a lobby (e.g., the lobby 325 described with reference to FIG. 3) and a horizontal distance away from the intersection 515; and intersection 545, which may correspond to an area near the conference room (e.g., the conference room 330 described with reference to FIG. 3) and a vertical distance away from the intersection 540.

In some examples, as part of generating the set of intersections of the map layer 500, the software may add data to the intersections describing attributes of the intersections. The data may include a name of the intersection, an identifier (e.g., identification number) of the intersection, a floor number of the intersection (e.g., which floor of the site or building the area corresponding to the intersection is on), a parent of the intersection, or any combination thereof. A parent of an intersection may correspond to a nearby intersection from which the user may access the intersection. For example, the intersection 515 may be the parent intersection of both the intersection 520 and the intersection 540. Additionally, the intersection 520 may be the parent of the intersection 525 and the intersection 540 may be the parent of the intersection 545.

In some cases, the intersections corresponding to a feature (e.g., as described with reference to FIG. 4) may be a nearest or nearby intersection. For example, the intersection for the feature 530 corresponding to the conference room may be the intersection 545. Accordingly, a last mile 550 for the feature 430 may be vertical, because the direction between the intersection 545 the intersection 540 (the intersection of the feature 430 and the corresponding parent intersection) may be vertical. In such cases, the route to a feature may be generated using the intersection of the feature and one or more corresponding parent intersections. For example, a route between the elevators and the conference room may go from the intersection 515 to the intersection 540 (e.g., the child intersection of intersection 515), and finally to the intersection 545 (e.g., the child intersection of the intersection 540). The sequence of intersections of a route may be an example of route information, and may be overlayed over the base image 505 and displayed to user in response to the request.

After the software (or software user) has defined the set of intersections of the map layer 500 and route information, the software may export the set of intersections and route information of the map layer 500 and the associated data. For example, the software may generate one or more files which include the intersections and associated data and store the one or more files in an electronic storage, such as a database of the server 110. Because the format of the one or more files may be specific to the software, the one or more files may not initially be compatible with other programs. Accordingly, the one or more files may be converted to a vector image file format, such as a geoJSON file format. In some examples, converting the one or more files to the vector image file format may include determining and storing a location for each intersections of the set of intersections. The location may be relative to an origin 535 of the base image 505, and may be an example of a set of rectangular coordinates.

Figure 6:
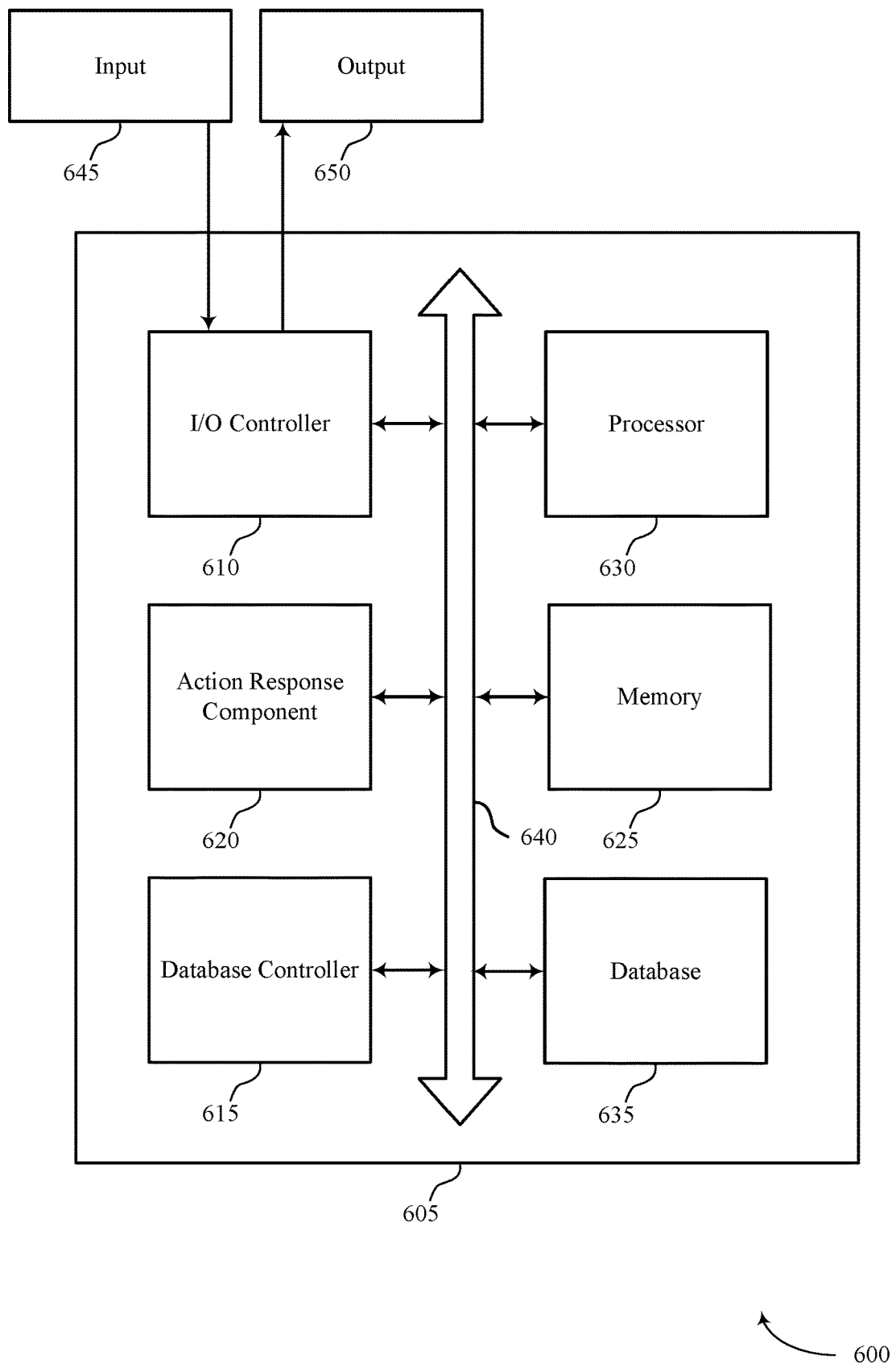
FIG. 6 shows a diagram of a system including a device that supports techniques for indoor wayfinding in accordance with examples as disclosed herein.

FIG. 6 shows a diagram of a system 600 including a device 605 that supports techniques for indoor wayfinding in accordance with examples as disclosed herein. The device 605 may include components for bi-directional voice and data communications including components for transmitting and receiving communications, such as an action response component 620, and I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. Additionally or alternatively, the I/O controller 610 may represent or interact with a modem, a keyboard, a mouse, a touchscreen, or a similar device. In some cases, the I/O controller 610 may be implemented as part of a processor. In some examples, a user may interact with the device 605 via the I/O controller 610 or via hardware components controlled by the I/O controller 610.

The database controller 615 may manage data storage and processing in a database 635. The database 635 may be external to the device 605, temporarily or permanently connected to the device 605, or a data storage component of the device 605. In some cases, a user may interact with the database controller 615. In some other cases, the database controller 615 may operate automatically without user interaction. The database 635 may be an example of a persistent data store, a single database, a distributed database, multiple distributed databases, a database management system, or an emergency backup database.

Memory 625 may include random-access memory (RAM) and ROM. The memory 625 may store computer-readable, computer-executable software including instructions that, when executed, cause the processor to perform various functions described herein. In some cases, the memory 625 may contain, among other things, a BIOS which may control basic hardware or software operation such as the interaction with peripheral components or devices.

The processor 630 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In some other cases, a memory controller may be integrated into the processor 630. The processor 630 may be configured to execute computer-readable instructions stored in memory 625 to perform various functions (e.g., functions or tasks supporting techniques for indoor wayfinding).

For example, the action response component 620 may be configured as or otherwise support a means for transmitting, to a server, a REST call requesting route data and feature data for generating a route between a first location and a second location different from the first location. The action response component 620 may be configured as or otherwise support a means for receiving a messages comprising the route data and the feature data from the server in response to the REST call, the feature data being associated with the first location and the second location, and the route data being associated with the route. The action response component 620 may be configured as or otherwise support a means for generating a map comprising a plurality of layers based at least in part on the feature data and the route data, the plurality of layers including a first layer comprising a raster image of a site, a second layer comprising a raster image of a floor plan corresponding to the site, a third layer comprising a vector image of a plurality of features corresponding to the floor plan, and a fourth layer comprising a vector image of the route between the first location and the second location. The action response component 620 may be configured as or otherwise support a means for displaying the map comprising the plurality of layers.

Figure 7:
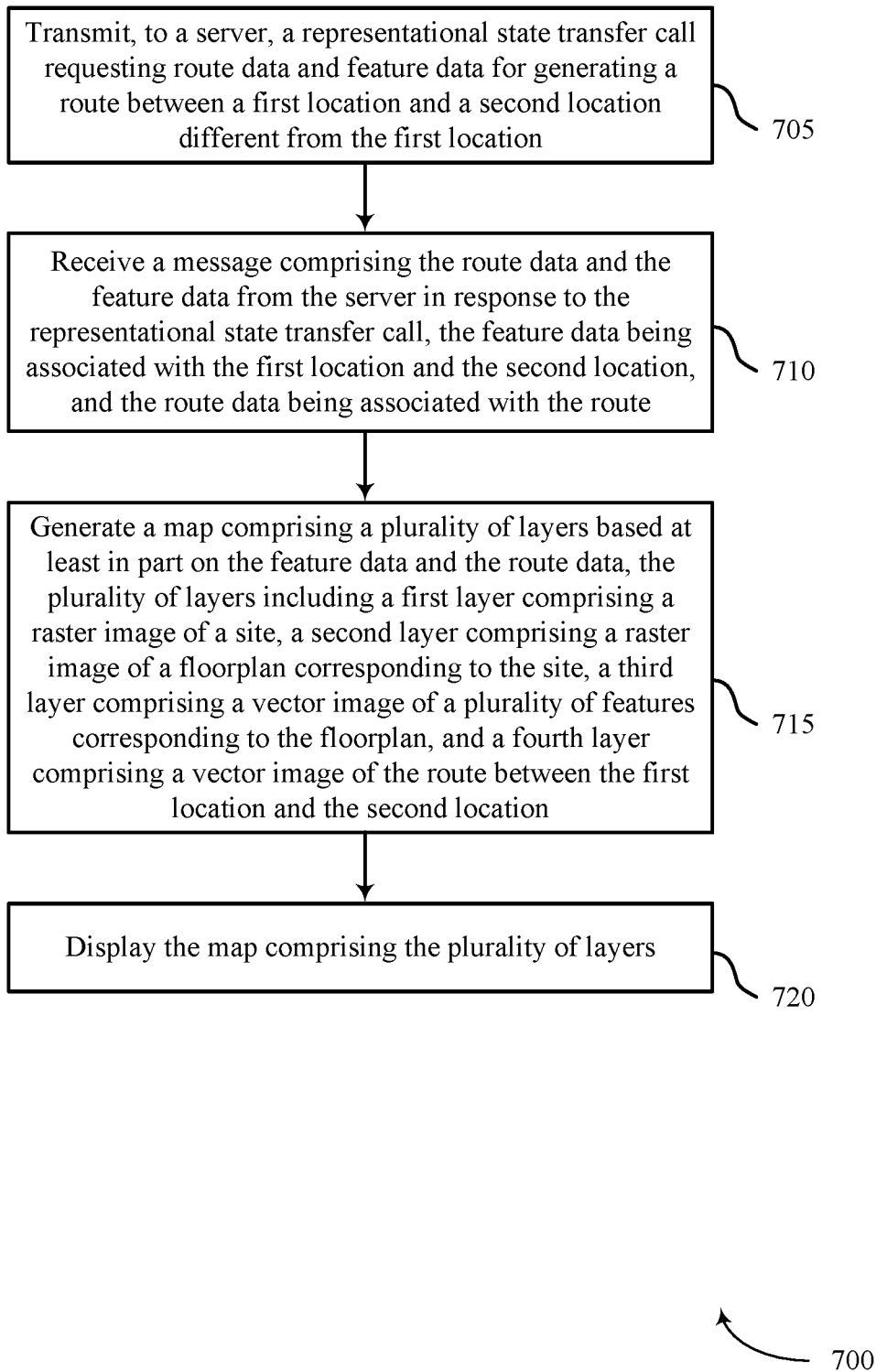
FIG. 7 shows a flowchart illustrating a method that supports techniques for indoor wayfinding in accordance with examples as disclosed herein.

FIG. 7 shows a flowchart illustrating a method 700 that supports techniques for indoor wayfinding in accordance with examples as disclosed herein. The operations of the method 700 may be implemented by a Generic Device or its components as described herein. For example, the operations of the method 700 may be performed by a Generic Device as described with reference to FIGS. 1 through 6. In some examples, a Generic Device may execute a set of instructions to control the functional elements of the Generic Device to perform the described functions. Additionally or alternatively, the Generic Device may perform aspects of the described functions using special-purpose hardware.

At 705, the method may include transmitting, to a server, a REST call requesting route data and feature data for generating a route between a first location and a second location different from the first location. The operations of 705 may be performed in accordance with examples as disclosed herein.

At 710, the method may include receiving a messages comprising the route data and the feature data from the server in response to the REST call, the feature data being associated with the first location and the second location, and the route data being associated with the route.

At 715, the method may include generating a map comprising a plurality of layers based at least in part on the feature data and the route data, the plurality of layers including a first layer comprising a raster image of a site, a second layer comprising a raster image of a floor plan corresponding to the site, a third layer comprising a vector image of a plurality of features corresponding to the floor plan, and a fourth layer comprising a vector image of the route between the first location and the second location.

At 720, the method may include displaying the map comprising the plurality of layers.

In some examples, an apparatus as described herein may perform a method or methods, such as the method 700. The apparatus may include features, circuitry, logic, means, or instructions (e.g., a non-transitory computer-readable medium storing instructions executable by a processor) for transmitting, to a server, a REST call requesting route data and feature data for generating a route between a first location and a second location different from the first location, receiving a messages comprising the route data and the feature data from the server in response to the REST call, the feature data being associated with the first location and the second location, and the route data being associated with the route, generating a map comprising a plurality of layers based at least in part on the feature data and the route data, the plurality of layers including a first layer comprising a raster image of a site, a second layer comprising a raster image of a floor plan corresponding to the site, a third layer comprising a vector image of a plurality of features corresponding to the floor plan, and a fourth layer comprising a vector image of the route between the first location and the second location, and displaying the map comprising the plurality of layers.

In some examples of the method 700 and the apparatus described herein, generating the map may include operations, features, circuitry, logic, means, or instructions for setting the raster image of the site as the first layer based at least in part on the first location and the second location being at the site and setting the raster image of the floor plan as the second layer based at least in part on a floor at the site including the first location and the second location.

In some examples of the method 700 and the apparatus described herein, the feature data comprises respective information for each feature of the plurality of features including first information for the first location and second information for the second location.

In some examples of the method 700 and the apparatus described herein, the first information comprises an identifier associated with the first location, a floor associated with the first location, an intersection associated with the first location, a type of the first location, an indicator of a remaining portion of a route to the first location, alternative route information for the first location, or any combination thereof and the second information comprises an identifier associated with the second location, a floor associated with the second location, an intersection associated with the second location, a type of the second location, an indicator of a remaining portion of a route to the second location, alternative route information for the second location, or any combination thereof.

In some examples of the method 700 and the apparatus described herein, the respective information for each feature of the plurality of features may be converted into map coordinates relative to an origin and the route may be generated for the fourth layer based at least in part on the map coordinates.

In some examples of the method 700 and the apparatus described herein, each feature of the plurality of features may be represented as an object that corresponds to a room, an office, a workstation, a desk, a space, an elevator, or any combination thereof.

In some examples of the method 700 and the apparatus described herein, the route data comprises one or more intersection objects associated with the route between the first location and the second location, each intersection object comprising a name, a floor identifier, a parent intersection identifier, or any combination thereof.

In some examples of the method 700 and the apparatus described herein, one or more intersection objects may be converted into respective map coordinates relative to an origin and the route may be generated for the fourth layer based at least in part on the respective map coordinates.

In some examples of the method 700 and the apparatus described herein, the floor plan may be from a set of two or more floor plans corresponding to the site, each floor plan of the set of two or more floor plans associated with a respective floor of the site.

In some examples of the method 700 and the apparatus described herein, the raster image of the floor plan may have fixed dimensions.

In some examples of the method 700 and the apparatus described herein, the raster image of the site may have fixed dimensions.

In some examples of the method 700 and the apparatus described herein, the route data and the feature data may be formatted in accordance with a geographic JavaScript object notation.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   transmitting, from a user device to a server, a representational state transfer call requesting route data and feature data for generating a route between a first location and a second location different from the first location, wherein the representational state transfer call comprises a header including first information associated with the user device, second information associated with the route data, and third information associated with the feature data;
   receiving a message comprising the route data and the feature data from the server in response to the representational state transfer call, the feature data being associated with the first location and the second location, wherein the feature data comprises one or more features associated with the first location and the second location, each feature of the one or more features comprising a respective first entry indicating a respective type of the feature, a respective second entry indicating respective properties of the feature, and a respective third entry indicating a respective geometry of the feature, and the route data being associated with the route, wherein the route data comprises an indication of a direction between a nearest intersection associated with the second location and the second location;
   retrieving, in response to the representational state transfer call and from a private database associated with the server, a raster image of a site and a raster image of a floor plan corresponding to the site;
   generating a map comprising a plurality of layers based at least in part on the feature data and the route data, the plurality of layers including a first layer comprising the raster image of the site, a second layer comprising the raster image of the floor plan, a third layer comprising a vector image of a plurality of features corresponding to the floor plan, and a fourth layer comprising a vector image of the route between the first location and the second location; and
   displaying the map comprising the plurality of layers.

2. The method of claim 1, wherein generating the map comprises:
   setting the raster image of the site as the first layer based at least in part on the first location and the second location being at the site; and
   setting the raster image of the floor plan as the second layer based at least in part on a floor at the site including the first location and the second location.

3. The method of claim 1, wherein the feature data comprises respective information for each feature of the plurality of features including first information for the first location and second information for the second location.

4. The method of claim 3, wherein:
   the first information comprises an identifier associated with the first location, a floor associated with the first location, an intersection associated with the first location, a type of the first location, an indicator of a remaining portion of a route to the first location, alternative route information for the first location, or any combination thereof, and
   the second information comprises an identifier associated with the second location, a floor associated with the second location, an intersection associated with the second location, a type of the second location, an indicator of a remaining portion of a route to the second location, alternative route information for the second location, or any combination thereof.

5. The method of claim 3, wherein:
   the respective information for each feature of the plurality of features is converted into map coordinates relative to an origin, and
   the route is generated for the fourth layer based at least in part on the map coordinates.

6. The method of claim 3, wherein each feature of the plurality of features is represented as an object that corresponds to a room, an office, a workstation, a desk, a space, an elevator, or any combination thereof.

7. The method of claim 1, wherein the route data comprises one or more intersection objects associated with the route between the first location and the second location, each intersection object comprising a name, a floor identifier, a parent intersection identifier, or any combination thereof.

8. The method of claim 7, wherein:
   one or more intersection objects are converted into respective map coordinates relative to an origin, and
   the route is generated for the fourth layer based at least in part on the respective map coordinates.

9. The method of claim 1, wherein the floor plan is from a set of two or more floor plans corresponding to the site, each floor plan of the set of two or more floor plans associated with a respective floor of the site.

10. The method of claim 1, wherein the raster image of the floor plan has fixed dimensions.

11. The method of claim 1, wherein the raster image of the site has fixed dimensions.

12. The method of claim 1, wherein the route data and the feature data are formatted in accordance with a geographic object notation.

13. A non-transitory computer-readable medium storing code, the code comprising instructions executable by a processor to:
   transmit, from a user device to a server, a representational state transfer call requesting route data and feature data for generating a route between a first location and a second location different from the first location, wherein the representational state transfer call comprises a header including first information associated with the user device, second information associated with the route data, and third information associated with the feature data;

receive a message comprising the route data and the feature data from the server in response to the representational state transfer call, the feature data being associated with the first location and the second location, wherein the feature data comprises one or more features associated with the first location and the second location, each feature of the one or more features comprising a respective first entry indicating a respective type of the feature, a respective second entry indicating respective properties of the feature, and a respective third entry indicating a respective geometry of the feature, and the route data being associated with the route, wherein the route data comprises an indication of a direction between a nearest intersection associated with the second location and the second location;

retrieve, in response to the representational state transfer call and from a private database associated with the server, a raster image of a site and a raster image of a floor plan corresponding to the site;

generate a map comprising a plurality of layers based at least in part on the feature data and the route data, the plurality of layers including a first layer comprising the raster image of the site, a second layer comprising the raster image of the floor plan, a third layer comprising a vector image of a plurality of features corresponding to the floor plan, and a fourth layer comprising a vector image of the route between the first location and the second location; and display the map comprising the plurality of layers.

14. The non-transitory computer-readable medium of claim 13, wherein the instructions to generate the map are executable by the processor to:

set the raster image of the site as the first layer based at least in part on the first location and the second location being at the site; and set the raster image of the floor plan as the second layer based at least in part on a floor at the site including the first location and the second location.

15. The non-transitory computer-readable medium of claim 13, wherein the feature data comprises respective information for each feature of the plurality of features including first information for the first location and second information for the second location.

16. The non-transitory computer-readable medium of claim 15, wherein:

the first information comprises an identifier associated with the first location, a floor associated with the first location, an intersection associated with the first location, a type of the first location, an indicator of a remaining portion of a route to the first location, alternative route information for the first location, or any combination thereof, and the second information comprises an identifier associated with the second location, a floor associated with the second location, an intersection associated with the second location, a type of the second location, an indicator of a remaining portion of a route to the second location, alternative route information for the second location, or any combination thereof.

17. The non-transitory computer-readable medium of claim 15, wherein:

the respective information for each feature of the plurality of features is converted into map coordinates relative to an origin, and the route is generated for the fourth layer based at least in part on the map coordinates.

18. The non-transitory computer-readable medium of claim 15, wherein each feature of the plurality of features is represented as an object that corresponds to a room, an office, a workstation, a desk, a space, an elevator, or any combination thereof.

19. The non-transitory computer-readable medium of claim 13, wherein the route data comprises one or more intersection objects associated with the route between the first location and the second location, each intersection object comprising a name, a floor identifier, a parent intersection identifier, or any combination thereof.

20. The non-transitory computer-readable medium of claim 19, wherein:

one or more intersection objects are converted into respective map coordinates relative to an origin, and the route is generated for the fourth layer based at least in part on the respective map coordinates.

21. The non-transitory computer-readable medium of claim 13, wherein the floor plan is from a set of two or more floor plans corresponding to the site, each floor plan of the set of two or more floor plans associated with a respective floor of the site.

22. The non-transitory computer-readable medium of claim 13, wherein:

the raster image of the floor plan has fixed dimensions.

23. The non-transitory computer-readable medium of claim 13, wherein:

the raster image of the site has fixed dimensions.

24. The non-transitory computer-readable medium of claim 13, wherein the route data and the feature data are formatted in accordance with a geographic object notation.

25. An apparatus, comprising:

a processor;

memory coupled with the processor; and instructions stored in the memory and executable by the processor to cause the apparatus to:

transmit, from a user device to a server, a representational state transfer call requesting route data and feature data for generating a route between a first location and a second location different from the first location, wherein the representational state transfer call comprises a header including first information associated with the user device, second information associated with the route data, and third information associated with the feature data;

receive a message comprising the route data and the feature data from the server in response to the representational state transfer call, the feature data being associated with the first location and the second location, wherein the feature data comprises one or more features associated with the first location and the second location, each feature of the one or more features comprising a respective first entry indicating a respective type of the feature, a respective second entry indicating respective properties of the feature, and a respective third entry indicating a respective geometry of the feature, and the route data being associated with the route, wherein the route data comprises an indication of a direction between a nearest intersection associated with the second location and the second location;
retrieve, in response to the representational state transfer call and from a private database associated with the server, a raster image of a site and a raster image of a floor plan corresponding to the site;
generate a map comprising a plurality of layers based at least in part on the feature data and the route data, the plurality of layers including a first layer comprising the raster image of the site, a second layer comprising the raster image of the floor plan corresponding to the site, a third layer comprising a vector image of a plurality of features corresponding to the floor plan, and a fourth layer comprising a vector image of the route between the first location and the second location; and
display the map comprising the plurality of layers.

* * * * *